(12) United States Patent
Nagata et al.

(10) Patent No.: US 11,438,476 B2
(45) Date of Patent: Sep. 6, 2022

(54) READING APPARATUS AND IMAGE FORMING APPARATUS

(71) Applicant: CANON KABUSHIKI KAISHA, Tokyo (JP)

(72) Inventors: Teppei Nagata, Tokyo (JP); Yukihiro Soeta, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/315,760

(22) Filed: May 10, 2021

(65) Prior Publication Data

US 2021/0360116 A1 Nov. 18, 2021

(30) Foreign Application Priority Data

May 15, 2020 (JP) .............................. JP2020-085710

(51) Int. Cl.
*H04N 1/00* (2006.01)
*G03G 15/00* (2006.01)

(52) U.S. Cl.
CPC ..... *H04N 1/00602* (2013.01); *G03G 15/6573* (2013.01); *H04N 1/00615* (2013.01);
(Continued)

(58) Field of Classification Search
CPC ...... G03G 15/10; G03G 15/11; G03G 15/104; G03G 15/0896; G03G 21/10; G03G 15/105; G03G 15/0815; G03G 15/2025; G03G 15/5062; G03G 21/1676; G03G 2215/2032; G03G 15/2028; G03G 15/2053; G03G 15/5016; G03G 15/6502; G03G 21/1633; G03G 15/065; G03G 15/0806; G03G 15/0808; G03G 15/0812; G03G 15/0844; G03G 15/0879; G03G 15/0887; G03G 15/095; G03G 15/1605; G03G 15/2017; G03G 15/2035; G03G 15/2039; G03G 15/206; G03G 15/55; G03G 15/553;
(Continued)

(56) References Cited

U.S. PATENT DOCUMENTS 9,551,966 B2 * 1/2017 Hirota ................ G03G 15/5062
10,160,612 B2 * 12/2018 Kawanishi ............. B65H 5/025
(Continued)

FOREIGN PATENT DOCUMENTS

JP 2009053346 A 3/2009

*Primary Examiner* — Negussie Worku
(74) *Attorney, Agent, or Firm* — Rossi, Kimms & McDowell LLP

(57) ABSTRACT

A reading apparatus includes a feeding roller pair configured to feed a sheet supplied from another apparatus that is to be connected to the reading apparatus; a tray provided above the feeding roller pair in a vertical direction; a conveyance path through which the sheet is to be conveyed to discharge the sheet fed by the feeding roller pair to the tray; a first conveyance roller pair which is provided in the conveyance path, and is configured to convey the sheet; a second conveyance roller pair which is provided in the conveyance path on a downstream of the first conveyance roller pair in a conveying direction in which the sheet is conveyed, and is configured to convey the sheet; and a reading unit configured to read an image formed on the sheet while moving in a direction orthogonal to the conveying direction.

18 Claims, 10 Drawing Sheets

(52) U.S. Cl.
CPC .................. *H04N 1/00631* (2013.01); *G03G 2215/00417* (2013.01)

(58) Field of Classification Search
CPC ........... G03G 15/6573; G03G 15/6576; G03G 21/0005; G03G 21/0023; G03G 21/0029; G03G 21/0076; G03G 21/0082; G03G 21/0088; G03G 21/105; G03G 21/12; G03G 21/1604; G03G 21/1647; G03G 21/169; G03G 21/1695; G03G 2215/0658; G03G 2215/2009; G03G 2215/2022; G03G 2215/2029; G03G 9/12; G03G 9/125; G03G 15/101; G03G 15/108; G03G 15/2032; G03G 15/2064; G03G 15/22; G03G 15/6529; G03G 2215/00417; G03G 2215/00569; G03G 2215/00616; G03G 2215/00738; G01N 21/8806; G03F 1/84; H04N 1/00602; H04N 1/00615; H04N 1/00015; H04N 1/00037; H04N 1/00082; H04N 1/00249; H04N 1/00267; H04N 1/0049; H04N 1/00493; H04N 1/00496; H04N 1/00564; H04N 1/00954; H04N 2201/0082; H04N 2201/0094; H04N 2201/0098; H04N 2201/3273; H04N 1/00559; H04N 1/00588; H04N 1/00631; H04N 1/409; B41J 11/0075; B65H 2301/511; B65H 2301/51232; B65H 2601/51; B65H 5/06; B65H 5/062; G06K 15/4025; G06K 15/408
USPC ......................................................... 358/474
See application file for complete search history.

(56) References Cited

U.S. PATENT DOCUMENTS

| | | | | |
|---|---|---|---|---|
| 11,150,587 | B2* | 10/2021 | Mita | B65H 29/145 |
| 11,350,005 | B2* | 5/2022 | Ochi | H04N 1/00795 |
| 2004/0066526 | A1* | 4/2004 | Inoo | G03G 15/502 |
| | | | | 358/1.14 |
| 2014/0211277 | A1* | 7/2014 | Ozaki | H04N 1/00588 |
| | | | | 358/496 |
| 2016/0313686 | A1* | 10/2016 | Tamura | G03G 15/6573 |
| 2017/0036873 | A1* | 2/2017 | Sekigawa | B65H 3/66 |
| 2017/0302814 | A1* | 10/2017 | Yamamoto | H04N 1/00615 |
| 2018/0305151 | A1* | 10/2018 | Ogata | B65H 29/22 |
| 2019/0149669 | A1* | 5/2019 | Morita | G06F 3/1208 |
| | | | | 382/112 |
| 2021/0084192 | A1* | 3/2021 | Kasuya | G03G 15/6502 |
| 2021/0099594 | A1* | 4/2021 | Ochi | H04N 1/00615 |
| 2021/0289090 | A1* | 9/2021 | Monma | H04N 1/00538 |

* cited by examiner

READING APPARATUS AND IMAGE FORMING APPARATUS

BACKGROUND OF THE INVENTION

Field of the Invention

The present disclosure relates to a reading apparatus configured to read an image formed on a sheet and an image forming apparatus which includes the reading apparatus.

Description of the Related Art

In recent years, the market for on-demand image forming apparatus is expanding. For example, in an offset printing market, electrophotographic image forming apparatus are becoming widespread. For example, image forming apparatus employing an inkjet system are succeeding in cultivating a wide market for reasons such as a large format, a low initial cost, and an extremely high speed. However, expansion of the market is not easy, and an image forming apparatus must maintain quality of images (hereinafter referred to as "image quality") of preceding image forming apparatus that have served the market.

The quality includes a tone characteristic, granularity, in-plane evenness, letter quality, and color reproducibility (including color stability), for example. It is said that the most important of those is the color reproducibility. A human has memories of empirically expected colors (in particular, human skin, sky, and metal, for example), and feels uncomfortable about colors that deviate this range of memory in some cases. Such colors of memory are called "memory colors." Reproducibility of the memory colors is important when the memory colors are output to a picture or the like. In addition, a group of office users who feel uncomfortable about a difference in color between a printed business document and a monitor, and a group of graphic arts users who deal with computer graphics have high demand for color reproducibility including stability of the on-demand image forming apparatus.

The color reproducibility also has a problem of color difference not only between apparatus of the same model, but also between apparatus of different models, between image forming apparatus employing different systems, or between an image forming apparatus and an image display apparatus, for example, a display. In order to perform color matching between those apparatus, software and a measuring instrument for creating a multidimensional look-up table (LUT) called an international color consortium (ICC) profile are available. Professional users may create an ICC profile of a printer and an ICC profile of an offset printing machine to construct a color management environment. As a result, the color to be output by the printer is allowed to be matched with the color to be printed by the offset printing machine. Thus, the printer can be used for color calibration of the offset printing machine or for printing of a small number of copies.

The contents of the ICC profile of the offset printing machine and the ICC profile of the printer are calibrated in association with a color space independent of the printing machine or the printer, based on results of measuring colors of a patch image through use of the measuring instrument. The color space is, for example, a CIE L*a*b* color space (CIE stands for Commission Internationale d'Eclairage). In this manner, the color to be printed by the printing machine and the color to be printed by the printer are allowed to be matched with each other. A color management module (CMM) can create print data by performing color conversion through use of those ICC profiles.

As described above, color management environments such as a measuring instrument, applications, and profile creation software are ready. However, an offline measuring instrument takes time to measure. Further, the color management environments have issues in, for example, creation of the ICC profile, uploading the ICC profile to the printer or the like, and effective usage of the uploaded ICC profile, and are not popular to general users. In order to increase the speed of the measurement, create the ICC profile easily, and automate the setting work, there has been provided an image forming apparatus including an image reading apparatus having an inline measuring instrument installed in the vicinity of a sheet discharge portion of the printer.

In U.S. Pat. No. 9,551,966 and Japanese Patent Application Laid-open No. 2009-53346, there is disclosed an image forming apparatus configured to detect a patch image formed on a sheet by a color sensor including a light source, a diffraction grating, and a position detection sensor. The color sensor has an inline measuring-instrument configuration to improve the detection accuracy. The detection value obtained by the color sensor can be converted into a spectral reflectance, and further converted into the CIE L*a*b* color space in consideration of, for example, tristimulus values.

As an index of color matching accuracy and color stability, the average of ΔE is defined to be 4.0 in the color matching accuracy standard (IT8.7/4 (ISO 12642: 1,617 patches) [4.2.2]) according to ISO 12647-7. Further, the reproducibility [4.2.3], which is a standard of color stability, defines that ΔE of each patch image is equal to or smaller than 1.5. In order to satisfy such specifications, it is desired that the detection accuracy for ΔE of the color sensor be equal to or smaller than 1.0. The value of ΔE is expressed by the following expression of a three-dimensional distance between two points (L1, a1, b1) and (L2, a2, b2) in the L*a*b* color space defined by the CIE.

$$\Delta E = ((L1-L2)^2 + (a1-a2)^2 + (b1-b2)^2)^{1/2}$$

As described above, currently, inline color management has been performed by the image forming apparatus including, at the subsequent stage of the printer, the reading apparatus having the color sensor (measuring instrument) installed thereon. However, for example, in the case of the configuration of U.S. Pat. No. 9,551,966, the color sensor is fixed, and hence the color sensor can read only the patch images present at a reading position of the color sensor in a direction (hereinafter referred to as "main scanning direction") orthogonal to a conveying direction of the sheet. Accordingly, the number of patch images to be read from one sheet is reduced. That is, the number of sheets required for the color management is increased. When a plurality of color sensors are arranged in the main scanning direction, a larger number of patch images can be read from one sheet. However, the color sensor is generally expensive, and hence the product cost is increased. Not only from the viewpoint of arranging a larger number of patch images, also in order to check image uniformity and density uniformity in the main scanning direction, the hue is required to be checked in the entire range in the main scanning direction.

When the color sensor is moved in the main scanning direction, scanning of the sheet in the main scanning direction is achieved. By performing the scanning in the main scanning direction and repeatedly performing the conveyance/stop of the sheet, detection of the patch images in the entire sheet range is achieved. If it is possible to detect the patch images in the entire sheet range, the number of patch images per sheet can be increased to reduce the number of sheets required for color correction. Further, the patch images in the entire range in the main scanning direction are detected, and hence the density uniformity in the main scanning direction can be corrected.

The color sensor is sometimes provided in a conveyance path configured to guide the sheet in a vertical direction. In this case, the sheet is read by the color sensor while being conveyed in the vertical direction. In a case in which a sheet conveyed in the vertical direction is to be read, when the sheet has a low stiffness, a state of the sheet becomes unstable due to its own weight. As a result, the color sensor may become immovable in the main scanning direction due to the sheet. Further, even when the color sensor is movable, a distance between the color sensor and the sheet may deviate from a required value, and thus measuring performance may not be ensured. The present disclosure has been made in view of the above-mentioned problems, and has a primary object to provide a reading apparatus capable of highly-accurately reading an image of a sheet conveyed in the vertical direction.

SUMMARY OF THE INVENTION

A reading apparatus according to the present disclosure includes: a feeding roller pair configured to feed a sheet supplied from another apparatus that is to be connected to the reading apparatus; a tray provided above the feeding roller pair in a vertical direction; a conveyance path through which the sheet is to be conveyed to discharge the sheet fed by the feeding roller pair to the tray; a first conveyance roller pair which is provided in the conveyance path, and is configured to convey the sheet; a second conveyance roller pair which is provided in the conveyance path on a downstream of the first conveyance roller pair in a conveying direction in which the sheet is conveyed, and is configured to convey the sheet; and a reading unit configured to read an image formed on the sheet while moving in a direction orthogonal to the conveying direction between the first conveyance roller pair and the second conveyance roller pair in the conveying direction, wherein, in a case where the reading unit reads the image on the sheet, after a leading edge of the sheet reaches the second conveyance roller pair, the reading unit moves to above the sheet along the direction orthogonal to the conveying direction.

Further features of the present invention will become apparent from the following description of exemplary embodiments (with reference to the attached drawings).

DESCRIPTION OF THE EMBODIMENTS

Now, description is given of an embodiment of the present disclosure with reference to the drawings.

<Image Forming Apparatus>

Figure 1:
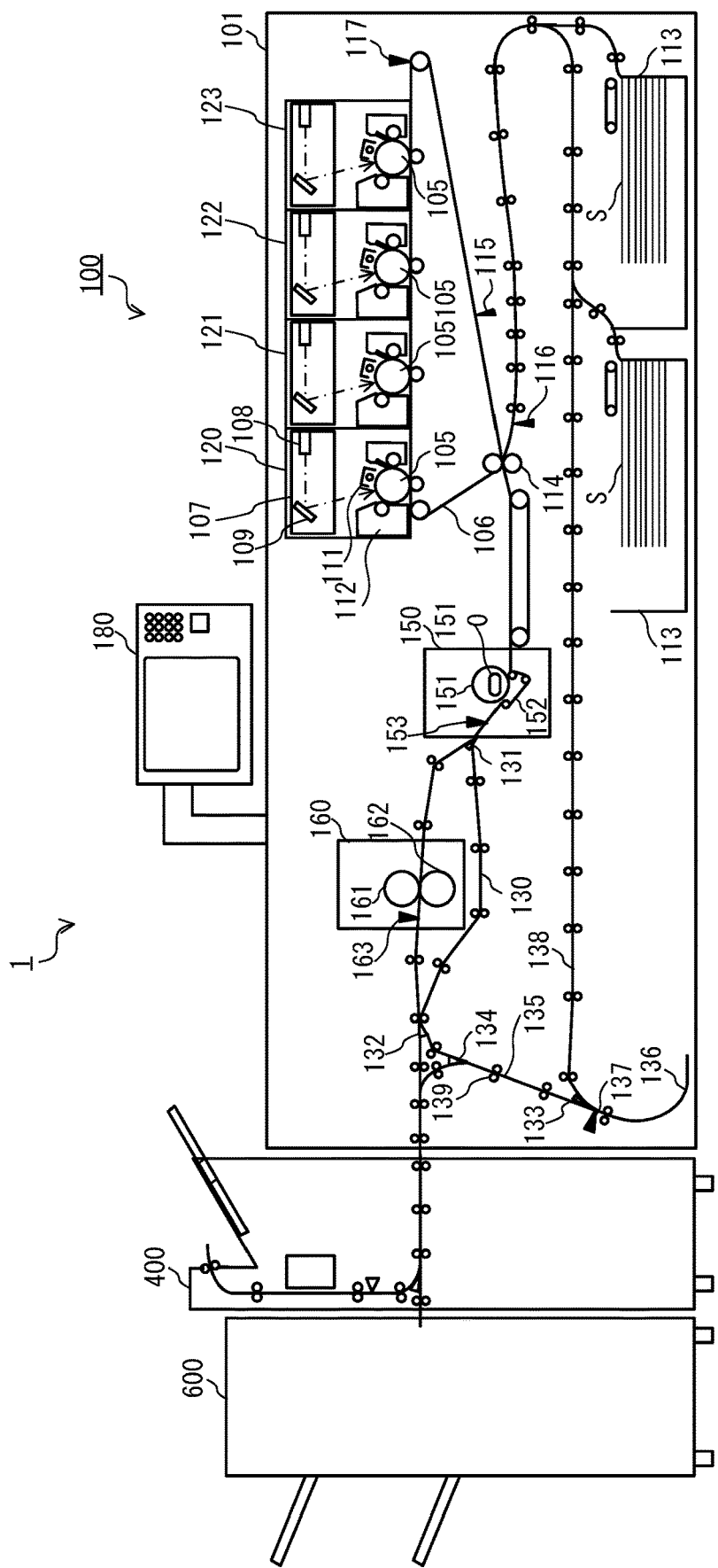
FIG. 1 is a configuration view of an image forming apparatus.

FIG. 1 is a configuration view of an image forming apparatus according to this embodiment. An image forming apparatus 1 according to this embodiment includes a printer 100, an automatic reading apparatus 400, and a sheet discharge apparatus 600. The printer 100 employs an electrophotographic system to form an image onto a sheet S. The printer in this embodiment may be an inkjet printer or a dye-sublimation printer.

The printer 100 includes, inside a casing 101, mechanisms which form an engine unit for use in image formation, and a controller to be described later. The controller is configured to control the operations of the mechanisms. An operation panel 180 is provided in an upper portion of the casing 101. The operation panel 180 is a user interface, and includes an input device configured to receive instructions from a user, and an output device configured to display a screen such as an operation screen. Examples of the input device include various key buttons and a touch panel. Examples of the output device include a display and a speaker. The mechanisms which form the engine unit include a mechanism (image forming mechanism) configured to form an image, a mechanism (transfer mechanism) configured to transfer the image onto the sheet S, a mechanism (feeding mechanism) configured to feed the sheet S, and a mechanism (fixing mechanism) configured to fix the image to the sheet S.

The image forming mechanism includes four image forming units 120, 121, 122, and 123 corresponding respective colors of yellow (Y), magenta (M), cyan (C), and black (K). The image forming units 120, 121, 122, and 123 are configured to form images of corresponding colors. The image forming units 120, 121, 122, and 123 have the same configuration, but differ only in color of the image to be formed. Description is given here of the configuration of the image forming unit 120, and description of the configurations of the other image forming units 121, 122, and 123 is omitted.

The image forming unit 120 includes a photosensitive drum 105, a charging device 111, a laser scanner 107, and a developing device 112. The photosensitive drum 105 is a drum-shaped photosensitive member having a photosensitive layer on its surface, and is configured to rotate about a drum shaft. The charging device 111 is configured to uniformly charge the photosensitive layer of the surface of the rotating photosensitive drum 105. The laser scanner 107 is configured to scan the surface of the photosensitive drum 105 with laser light modulated based on image data representing the image to be formed. The laser scanner 107 includes a light emitting portion 108 configured to scan the laser light emitted from a semiconductor laser in one direction, and a reflective mirror 109 configured to reflect the laser light emitted from the light emitting portion 108 toward the photosensitive drum 105. A direction in which the laser scanner 107 scans the photosensitive drum 105 (depth direction of FIG. 1) corresponds to a main scanning direction.

When the charged photosensitive drum 105 is scanned with the laser light, an electrostatic latent image corresponding to the image data is formed on its surface. The developing device 112 is configured to develop the electrostatic latent image formed on the photosensitive drum 105 with developer that corresponds to the color. In this manner, a visible image of the electrostatic latent image is formed on the surface of the photosensitive drum 105. On the photosensitive drum 105 of the image forming unit 120, a yellow image is formed. On the photosensitive drum 105 of the image forming unit 121, a magenta image is formed. On the photosensitive drum 105 of the image forming unit 122, a cyan image is formed. On the photosensitive drum 105 of the image forming unit 123, a black image is formed. The photosensitive drum 105 and the developing device 112 are removable from the casing 101.

The transfer mechanism includes an intermediate transfer member 106 and transfer rollers 114. Onto the intermediate transfer member 106, images are sequentially transferred in superimposition from the photosensitive drums 105 of the respective image forming units 120, 121, 122, and 123. In this embodiment, the intermediate transfer member 106 is configured to rotate in the clockwise direction of FIG. 1, and images are transferred in order of the image forming unit 120 (yellow), the image forming unit 121 (magenta), the image forming unit 122 (cyan), and the image forming unit 123 (black). An image density detection sensor 117 is provided on the downstream of the image forming unit 123 in the rotating direction of the intermediate transfer member 106. The image density detection sensor 117 is configured to detect an image density from an image for image density detection formed on the intermediate transfer member 106.

The images transferred onto the intermediate transfer member 106 are conveyed to reach the transfer rollers 114 as the intermediate transfer member 106 is rotated. An image formation start position detection sensor 115 is provided on the upstream of the transfer rollers 114 in the rotating direction of the intermediate transfer member 106. The image formation start position detection sensor 115 is used to determine a transfer position for transfer onto the sheet S. The transfer rollers 114 are configured to bring the sheet S into pressure-contact with the intermediate transfer member 106, and are to be applied with a bias having an opposite characteristic to that of an image formed on the intermediate transfer member 106. Thus, the images are transferred onto the sheet S from the intermediate transfer member 106.

The feeding mechanism includes a sheet feeding cassette 113 configured to store the sheet S, a conveyance path through which the sheet S is to be fed, and various rollers for conveying the sheet S through the conveyance path. The sheet S is fed from the sheet feeding cassette 113, conveyed through the conveyance path so that the images are transferred and fixed to be formed thereon, and is discharged to the outside of the casing 101.

Accordingly, the sheet S is first fed from the sheet feeding cassette 113, and is then conveyed through the conveyance path to reach the transfer rollers 114. A sheet feeding timing sensor 116 is provided in the middle of the conveyance path from the sheet feeding cassette 113 to the transfer rollers 114. The sheet feeding timing sensor 116 is used to adjust the timing to convey the sheet S. The timing to convey the sheet S to the transfer rollers 114 is adjusted based on the timing at which the image formation start position detection sensor 115 detects the images formed on the intermediate transfer member 106 and the timing at which the sheet feeding timing sensor 116 detects the sheet S. In this manner, the images are transferred onto a predetermined position of the sheet S from the intermediate transfer member 106.

The sheet S having the images transferred thereon is conveyed to the fixing mechanism. The fixing mechanism in this embodiment includes a first fixing device 150 and a second fixing device 160. The first fixing device 150 includes a fixing roller 151, a pressure belt 152, and a post-fixing sensor 153. The fixing roller 151 is configured to heat the sheet S in order to thermally pressure-fix the images onto the sheet S. The pressure belt 152 is used to bring the sheet S to pressure contact with the fixing roller 151. The post-fixing sensor 153 is configured to detect that the fixing is finished. The fixing roller 151 is a hollow roller, and includes therein a heater 1510. The fixing roller 151 is configured to rotate to convey the sheet S. The pressure belt 152 is configured to bring the sheet S into pressure contact with the fixing roller 151. The post-fixing sensor 153 is configured to detect the sheet S subjected to image fixing.

The second fixing device 160 is arranged on the downstream with respect to the first fixing device 150 in the conveying direction of the sheet S, and is used to add gloss to the image formed on the sheet S subjected to fixing processing by the first fixing device 150 or to ensure the fixing performance. The second fixing device 160 includes a fixing roller 161, a pressure roller 162, and a post-fixing sensor 163. The fixing roller 161 has a configuration similar to that of the fixing roller 151, and functions similarly to the fixing roller 151. The pressure roller 162 functions similarly to the pressure belt 152. The post-fixing sensor 163 functions similarly to the post-fixing sensor 153. The second fixing device 160 performs fixing processing to the sheet S similarly to the first fixing device 150.

The second fixing device 160 may not be used depending on the type of the sheet S and the content of the image formation processing. A conveyance path 130 is provided in order to convey the sheet S subjected to fixing processing by the first fixing device 150 without causing the sheet S to pass through the second fixing device 160. Accordingly, a flapper 131 is provided on the downstream of the first fixing device 150 in the conveying direction of the sheet S. The flapper 131 is used to guide the sheet S to any one of the second fixing device 160 and the conveyance path 130.

The sheet S that has passed through any one of the second fixing device 160 and the conveyance path 130 is discharged as it is in some cases, and is conveyed to a conveyance path 135 in other cases. Accordingly, a flapper 132 is provided at a position after a junction between a conveyance path following the second fixing device 160 and the conveyance path 130. The flapper 132 is used to guide the sheet S to any one of the conveyance path 135 and a discharge path of the sheet S. The sheet S guided to the discharge path is discharged to the outside of the casing 101 with its surface having the image formed thereon facing upward.

The conveyance path 135 is a path for conveying the sheet S to a reverse path 136 to be used for reversing the front and back surfaces of the sheet S. A reverse sensor 137 configured to detect the sheet S is provided in the reverse path 136. When the reverse sensor 137 detects the trailing edge of the sheet S, the conveying direction of the sheet S is reversed in the reverse path 136. The sheet S whose conveying direction is reversed is conveyed to any one of the conveyance path 135 and a reverse path 138. Accordingly, a flapper 133 is provided at a branch of the conveyance path 135 and the reverse path 138. When being conveyed to the conveyance path 135, the sheet S is guided by the flapper 133 to the conveyance path 135, and is discharged to the outside of the casing 101 with its front and back surfaces being reversed (surface having the image formed thereon facing downward). When being conveyed to the reverse path 138, the sheet S is guided by the flapper 133 to the reverse path 138. The sheet S guided to the reverse path 138 is conveyed to the transfer rollers 114 again with its front and back surfaces being reversed. In this manner, image formation is performed on the back surface of the sheet S.

<Automatic Reading Apparatus>

Figure 2:
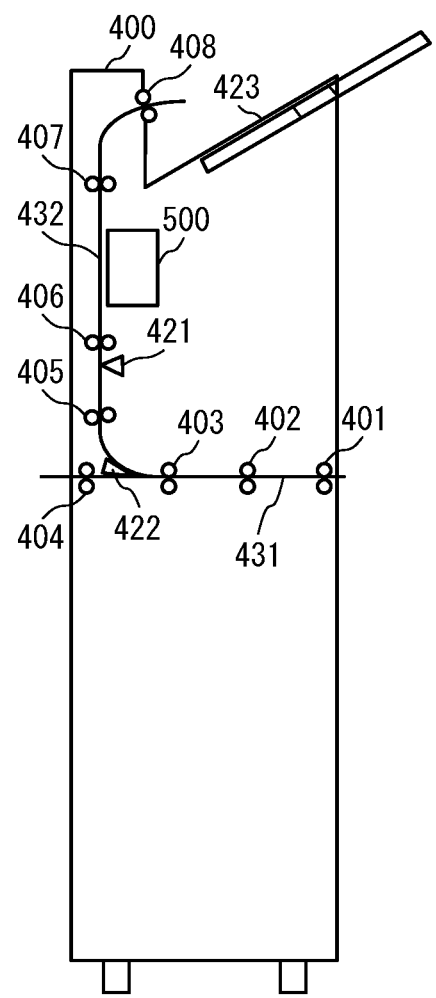
FIG. 2 is a configuration view of an automatic reading apparatus.

FIG. 2 is a configuration view of the automatic reading apparatus 400. The automatic reading apparatus 400 is provided at the subsequent stage of the printer 100, and is configured to receive the sheet S subjected to image formation and discharged from the printer 100. The automatic reading apparatus 400 includes two conveyance paths of a through-path 431 and a reading path 432. The through-path 431 is provided so as to convey the sheet S in the horizontal direction. The reading path 432 is provided so as to convey the sheet S in the vertical direction. In the through-path 431, conveyance rollers 401, 402, and 403 and discharge rollers 404 are provided. The conveyance rollers 401 function as feeding rollers configured to feed the sheet S. In the reading path 432, conveyance rollers 405, 406, and 407 and discharge rollers 408 are provided. In the reading path 432, a sheet sensor 421 is arranged between the conveyance rollers 405 and the conveyance rollers 406, and a reading unit 500 is arranged between the conveyance rollers 406 and the conveyance rollers 407. The sheet S transmitted from the printer 100 is conveyed by the conveyance rollers 401, 402, and 403 to a branch point between the through-path 431 and the reading path 432. The sheet S is conveyed to any one of the through-path 431 and the reading path 432 at the branch point. Accordingly, a flapper 422 is provided at the branch point between the through-path 431 and the reading path 432. The flapper 422 is to be controlled between a first state in which the sheet S is conveyed to the reading path 432, and a second state in which the sheet S is conveyed to the through-path 431 without being conveyed to the reading path 432.

When the sheet S is to be directly conveyed through the through-path 431, the sheet S is guided by the flapper 422 to the discharge roller 404 side, and is discharged to the outside of the automatic reading apparatus 400 (to the sheet discharge apparatus 600). The sheet discharge apparatus 600 is configured to discharge the sheet S to the outside. The sheet discharge apparatus 600 may be a post-processing apparatus configured to perform post-processing, such as binding processing and bookbinding processing, to the sheets S.

When the sheet S is to be conveyed to the reading path 432, the sheet S is guided by the flapper 422 to the reading path 432. The sheet S guided to the reading path 432 has its patch image read by the reading unit 500, and is then discharged to a discharge tray 423 by the discharge rollers 408. The discharge tray 423 is provided above the conveyance rollers 401 in the vertical direction. The discharge tray 423 in this embodiment is provided at an upper portion of the automatic reading apparatus 400. The reading unit 500 is an inline sensor configured to read an image from the sheet S conveyed through the reading path 432.

<Color Measurement Unit>

Figure 3:
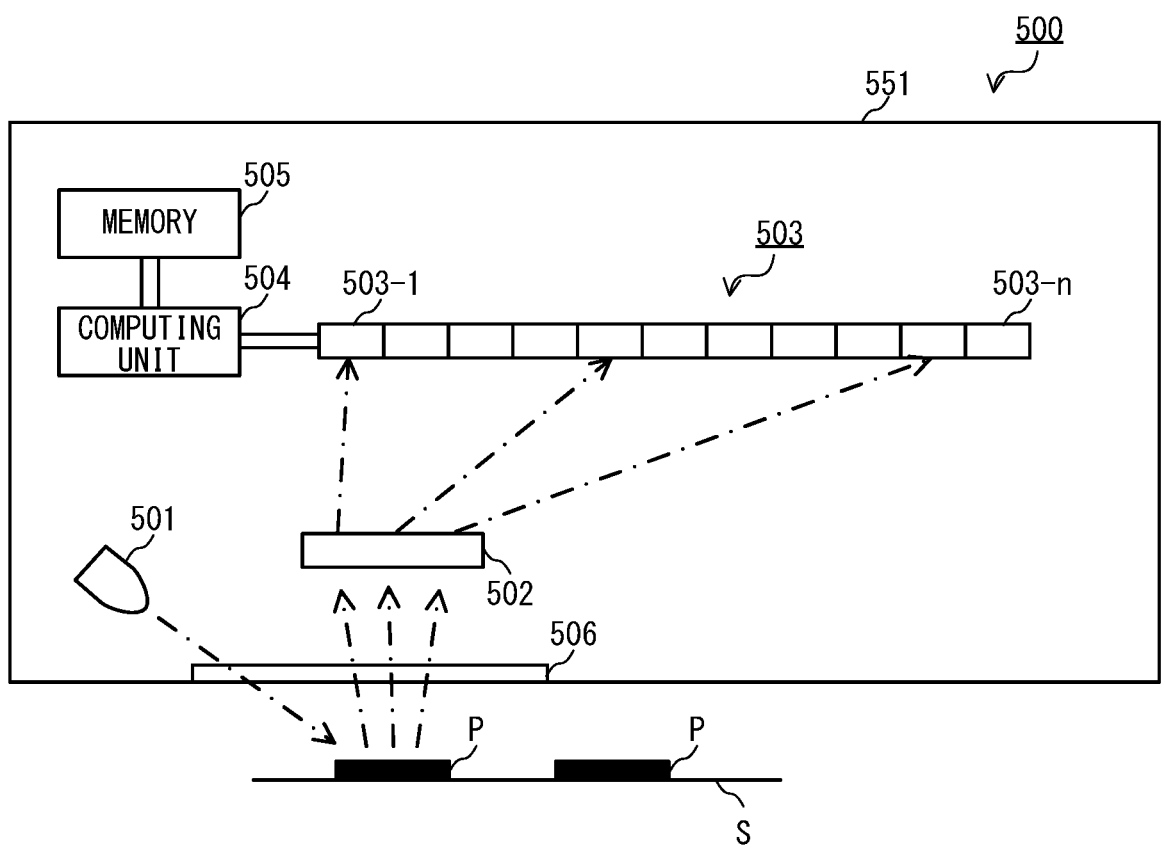
FIG. 3 is an explanatory configuration view of a reading unit.

FIG. 3 is an explanatory configuration view of the reading unit 500. The reading unit 500 includes a color detection sensor 551. The color detection sensor 551 is a color sensor configured to perform measurement of light reflected by a patch image P formed on the sheet S. The color detection sensor 551 includes a white light emitting diode (LED) 501, a diffraction grating 502, a line sensor 503, a computing unit 504, a memory 505, and a lens 506. The color detection sensor 551 is configured to read an image formed on the sheet S while moving in the main scanning direction (depth direction of FIG. 2) orthogonal to the conveying direction of the sheet S. A moving mechanism configured to move the color detection sensor 551 in the main scanning direction is described later.

The white LED 501 is a light emitting portion, and is configured to radiate white light to the sheet S conveyed through the reading path 432. The diffraction grating 502 is configured to spectrally disperse the light reflected by the patch image P by wavelength. The lens 506 is configured to condense the white light radiated from the white LED 501 to the patch image P, and also condense the light reflected by the patch image P to the diffraction grating 502.

The line sensor 503 is a light receiving portion including "n" light receiving elements 503-1 to 503-$n$. Each of the light receiving elements 503-1 to 503-$n$ of the line sensor 503 is configured to receive the reflected light spectrally dispersed by wavelength by the diffraction grating 502. Each of the light receiving elements 503-1 to 503-$n$ is configured to output, as a detection result, a light intensity value indicating an intensity of the received reflected light. The computing unit 504 is configured to perform predetermined computation on the light intensity value output from each of the light receiving elements 503-1 to 503-$n$. For example, the computing unit 504 is configured to perform spectral computation or computation of a Lab value with respect to the light intensity value. The memory 505 stores various types of data, for example, computation results.

<Controller>

Figure 4:
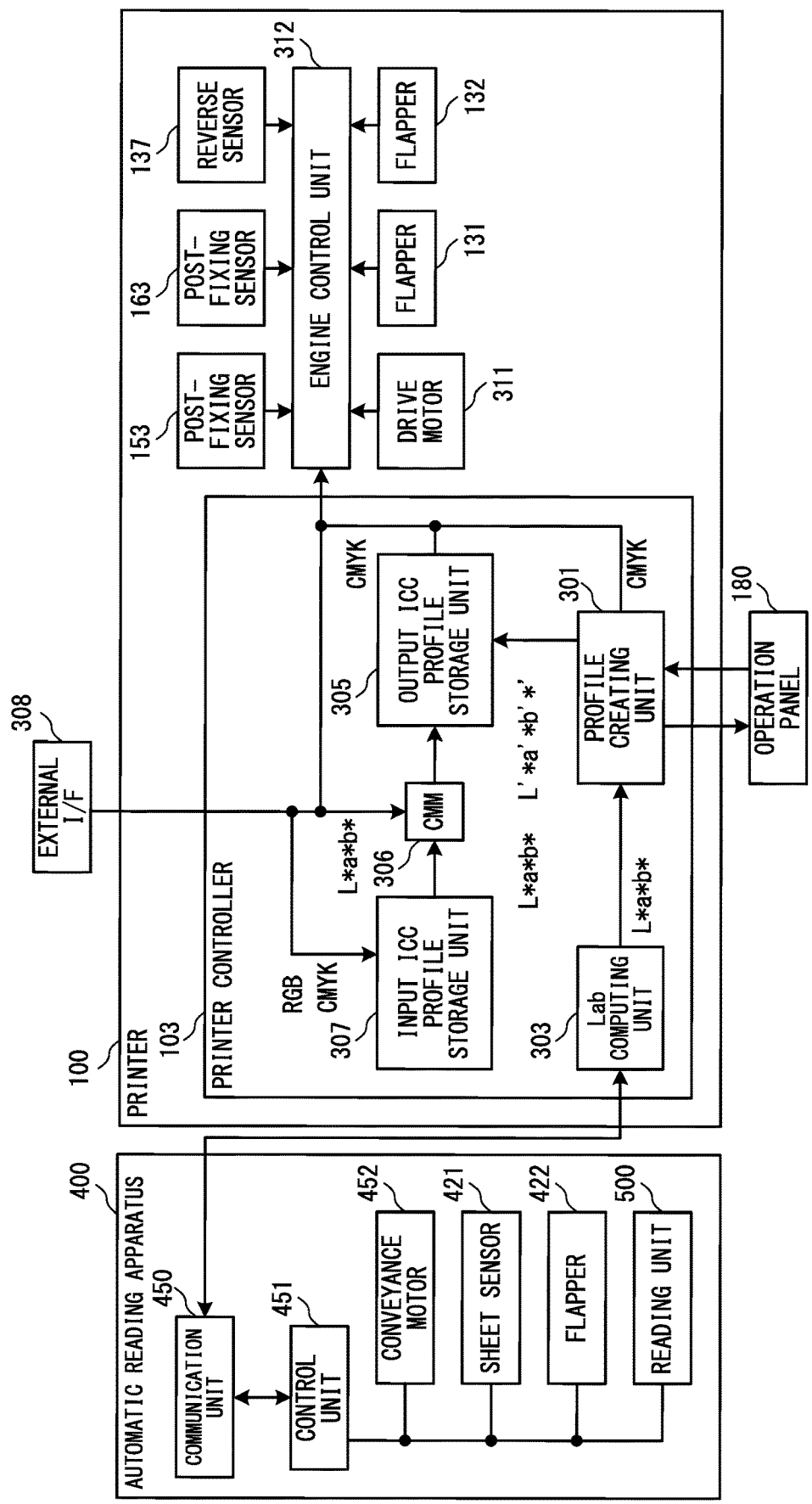
FIG. 4 is an explanatory diagram of a controller.

FIG. 4 is an explanatory diagram of a controller configured to control the operation of the image forming apparatus 1 configured as described above. The printer 100 includes, as the controller, a printer controller 103 and an engine control unit 312. The printer controller 103 is configured to control the operation of the printer 100. The engine control unit 312 is configured to control the operation of the engine unit for use in image formation. The automatic reading apparatus 400 includes a control unit 451 and a communication unit 450. The control unit 451 is configured to control the operation of the automatic reading apparatus 400. The communication unit 450 is configured to perform communication to/from the printer controller 103. The printer controller 103, the engine control unit 312, and the control unit 451 are each formed of a processor such as a CPU, an MPU, or an ASIC.

The engine control unit 312 is connected to the post-fixing sensors 153 and 163, the reverse sensor 137, a drive motor 311, and the flappers 131 and 132. The drive motor 311 is configured to drive the rollers for conveying the sheet S. The engine control unit 312 is configured to control the drive motor 311 and the flappers 131 and 132 based on the detection results obtained by the respective sensors, to thereby cause the engine unit to convey the sheet S. Further, although not shown, the engine control unit 312 is configured to control the operations of the image forming mechanism, the transfer mechanism, the feeding mechanism, and the fixing mechanism to perform image formation onto the sheet S. The operation of the engine control unit 312 is controlled by the printer controller 103.

The printer controller 103 is connected to the operation panel 180 and an external I/F 308. The external I/F 308 is a communication interface for performing communication to/from an external apparatus via a predetermined network. The printer controller 103 can receive a job or the like from the external apparatus via the external I/F 308. Details of the operation of the printer controller 103 are described later.

The control unit 451 of the automatic reading apparatus 400 is connected to a conveyance motor 452, the sheet sensor 421, the flapper 422, and the reading unit 500. The control unit 451 is configured to communicate to/from the printer controller 103 via the communication unit 450, to thereby perform processing in cooperation with the printer controller 103. The control unit 451 is configured to control, through use of the conveyance motor 452, the operations of the conveyance rollers 401, 402, and 403, the discharge rollers 404, the conveyance rollers 405, 406, and 407, and the discharge rollers 408 in the automatic reading apparatus 400, to thereby convey the sheet S. The control unit 451 is configured to control the operation of the flapper 422. The control unit 451 is configured to control the operation of the reading unit 500 in accordance with the timing at which the sheet sensor 421 detects the sheet S, to thereby detect the patch image P formed on the sheet S.

<Basic Adjustment Processing>

The image forming apparatus 1 according to this embodiment forms the patch image P for maintaining the image quality onto the sheet S by the printer 100. The printer 100 conveys the sheet S having the patch image P formed thereon to the automatic reading apparatus 400. The automatic reading apparatus 400 reads the patch image P formed on the sheet S by the reading unit 500 (color detection sensor 551). The printer controller 103 performs feedback control based on the detection result (reading result) obtained by the color detection sensor 551, to thereby maintain the image quality, for example, color reproducibility. Accordingly, the printer controller 103 corrects, based on the reading result obtained by the reading unit 500, an image forming condition to be used by the printer 100 so as to maintain the image quality, for example, the color reproducibility.

The image forming apparatus 1 according to this embodiment creates a profile as the image forming condition, and performs image formation through use of the created profile. As a profile for achieving excellent color reproducibility, in this embodiment, an ICC profile is used. As the profile, for example, a color rendering dictionary (CRD), a color separation table, CMYK simulation in ColorWise can also be used.

<Measurement of Spectral Reflectance and Chromaticity Computation>

The automatic reading apparatus 400 is configured to measure the spectral reflectance of the patch image P by the color detection sensor 551. The automatic reading apparatus 400 is configured to convert the measurement result of the spectral reflectance of the patch image P into chromaticity, to thereby create an ICC profile as a color conversion profile. The internal conversion color processing is performed by using the created ICC profile.

A calculation expression for chromaticity is described. The color detection sensor 551 spectrally disperses white light radiated from the white LED 501 and reflected by a measurement target by the diffraction grating 502, and detects the dispersed light by the light receiving elements 503-1 to 503-$n$ arranged in respective wavelength regions of from 380 nm to 720 nm. The computing unit 504 of the color detection sensor 551 calculates the spectral reflectance from the detection result obtained by each of the light receiving elements 503-1 to 503-$n$. In this embodiment, in order to improve the detection computation accuracy, the Lab computing unit 504 converts the spectral reflectance into chromaticity value (L*, a*, b*) through use of color matching functions as defined by the CIE. The ICC profile being the color conversion profile is created based on a relationship between the L*, a*, and b* and a signal value (image data) of the patch image P.

<L*a*b* Computation>

The following refers to a method of calculating the chromaticity value (L*, a*, b*) from the spectral reflectance (defined in ISO 13655).

a. The spectral reflectance R($\lambda$) of the sample is obtained (from 380 nm to 780 nm).

b. Color matching functions x($\lambda$), y($\lambda$), and z($\lambda$) and a standard light spectral distribution SD50($\lambda$) are prepared.

The color matching functions are defined by JIS Z8701. SD50($\lambda$) is defined by JIS Z8720, and is also called an auxiliary standard illuminant D50.

c. R($\lambda$)×SD50($\lambda$)×x($\lambda$), R($\lambda$)×SD50($\lambda$)×y($\lambda$), R($\lambda$)×SD50($\lambda$)×z($\lambda$) d. Integration of each wavelength is performed.

$$\Sigma\{R(\lambda) \times SD50(\lambda) \times x(\lambda)\}$$

$$\Sigma\{R(\lambda) \times SD50(\lambda) \times y(\lambda)\}$$

$$\Sigma\{R(\lambda) \times SD50(\lambda) \times z(\lambda)\}$$

e. The product of the color matching function y($\lambda$) and the standard light spectral distribution SD50($\lambda$) is integrated with respect to each wavelength.

$$\Sigma\{SD50(\lambda) \times y(\lambda)\}$$

f. X, Y, and Z are calculated.

$$X = 100 \times \Sigma\{SD50(\lambda) \times y(\lambda)\} / \Sigma\{R(\lambda) \times SD50(\lambda) \times x(\lambda)\}$$

$$Y = 100 \times \Sigma\{SD50(\lambda) \times y(\lambda)\} / \Sigma\{R(\lambda) \times SD50(\lambda) \times y(\lambda)\}$$

$$Z = 100 \times \Sigma\{SD50(\lambda) \times y(\lambda)\} / \Sigma\{R(\lambda) \times SD50(\lambda) \times z(\lambda)\}$$

g. L*, a*, and b* are calculated.

$$L^* = 116 \times (Y/Yn)^{(1/3)} - 16$$

$$a^* = 500\{(X/Xn)^{(1/3)} - (Y/Yn)^{(1/3)}\}$$

$$b^* = 200\{(Y/Yn)^{(1/3)} - (Z/Zn)^{(1/3)}\}$$

provided that $Y/Yn > 0.008856$

When $Y/Yn > 0.008856$ is satisfied, Xn, Yn, and Zn are tristimulus values of standard light.

$$(X/Xn)^{(1/3)} = 7.78(X/Xn)^{(1/3)} + 16/116$$

$$(Y/Yn)^{(1/3)} = 7.78(Y/Yn)^{(1/3)} + 16/116$$

$$(Z/Zn)^{(1/3)} = 7.78(Z/Zn)^{(1/3)} + 16/116$$

<Profile Creation>

When a user desires to know the hue of a final output product, the user operates the operation panel 180 to give an instruction to perform profile creation processing. The time when the user desires to know the hue of the final output product is, for example, the time of component replacement by a customer engineer, the time before a job for which color matching accuracy is required is output, or at the design planning stage. The printer controller 103 creates a profile in accordance with the instruction from the operation panel 180. As illustrated in FIG. 4, the printer controller 103 includes a profile creating unit 301, the Lab computing unit 303, an output ICC profile storage unit 305, a CMM 306, and an input ICC profile storage unit 307.

A profile creation instruction is input from the operation panel 180 to the profile creating unit 301. The profile creating unit 301 transmits, in accordance with the instruction, a signal to the engine control unit 312 so as to form CMYK (cyan, magenta, yellow, and black) color signals (patch image) of an ISO 12642 test form without using a profile. At the same time, the printer controller 103 transmits a reading instruction to the color detection sensor 551. The engine control unit 312 controls the operation of the printer 100 to print the ISO 12642 test form (patch image) onto the sheet S. With respect to the sheet S having the test form (patch image) printed thereon, the patch images included in the patch image are read by the color detection sensor 551. The spectral reflectance of the reading result of 928 patch images is computed. The spectral reflectance is input to the printer controller 103. The spectral reflectance is converted into data of L*, a*, and b* by the Lab computing unit 303, and the data is input to the profile creating unit 301. The spectral reflectance may be converted into a CIE 1931XYZ colorimetric system, which is an apparatus-independent color space signal, and is different from the L*a*b*.

The profile creating unit 301 creates an output ICC profile based on the relationship between the CMYK color signals of the test form and the input data of L*, a*, and b*. The profile creating unit 301 exchanges the output ICC profile already stored in the output ICC profile storage unit 305 for the created output ICC profile.

The ISO 12642 test form includes patch images of CMYK color signals covering a color reproducible range that can be output by general copying machines. The profile creating unit 301 creates a color conversion table based on the relationship between each color signal value and the data of L*, a*, and b* (computation result). That is, a conversion table (A2Bx tag) from CMYK to data of Lab is created. An inverse conversion table (B2Ax tag) is created based on this conversion table.

Figures 5, 6:
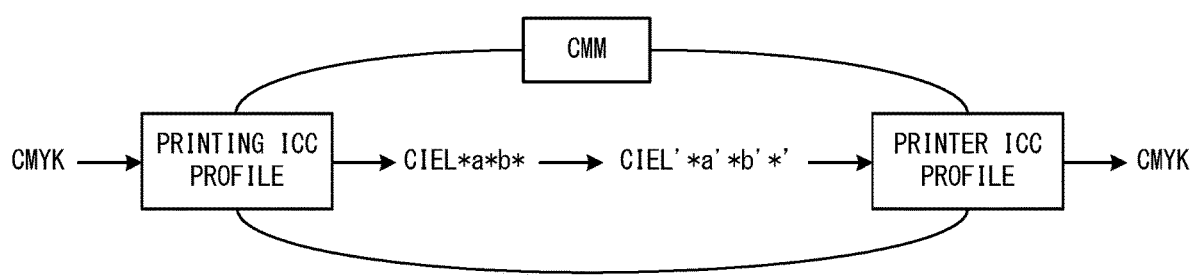
FIG. 5 is an explanatory view of an ICC profile.
FIG. 6 is an explanatory view of color management.

FIG. 5 is an explanatory view of the ICC profile. The ICC profile includes a header, tags, and data. In addition to the color conversion table, for example, the tags describe even a tag (gamt) representing whether a given color expressed by a white point (Wtpt) or a Lab value defined in the profile falls inside or outside the reproducible range of the hard copy.

The printer controller 103 may receive the profile creation instruction from the external apparatus via the external I/F 308. In this case, the printer controller 103 acquires an output ICC profile created by the external apparatus, and performs color conversion by an application corresponding to the ICC profile.

<Color Conversion Processing>

In color conversion in general color image formation, image data input via the external I/F 308, assuming to be RGB signal values or standard printing CMYK signal values of Japan Color or the like, is stored in the input ICC profile storage unit 307 for external input. In this case, the external I/F 308 is connected to a scanner or the like as the external apparatus. The image data stored in the input ICC profile storage unit 307 is subjected to conversion of from RGB to L*a*b* or from CMYK to L*a*b*. The input ICC profile is formed of a one-dimensional LUT for controlling a gamma value of an input signal, a multi-dimensional color LUT that is called direct mapping, and a one-dimensional LUT for controlling a gamma value of generated conversion data. Using these tables, the image data stored in the input ICC profile storage unit 307 is converted into device-independent data of L*, a*, and b* from the device-dependent color space.

The image data converted into the color coordinate of L*, a*, and b* is input to the CMM 306. FIG. 6 is an explanatory view of color management performed by the CMM 306. The CMM 306 performs GUMAT conversion of mapping a mismatch between a reading color space of the scanner or the like serving as the external apparatus and an output color reproducible range of the printer 100 serving as an output apparatus. Further, the CMM 306 performs color conversion of adjusting a mismatch (also called a color temperature setting mismatch) between a light source type in input and a light source type in observing an output product. The CMM 306 further performs black letter determination or the like. In this manner, the data of L*a*b* is converted into data of L*'a*'b*' to be stored in the output ICC profile storage unit 305. As described above, the created profile is stored in the output ICC profile storage unit 305. Color conversion is performed based on the newly created ICC profile to convert the data into CMYK signals dependent on the output apparatus. The CMYK signals are thus output. As illustrated in FIG. 6, the CMM 306 is a module configured to perform the color management. The CMM 306 is a module that performs color conversion using an input profile and an output profile.

<Reading Unit>

Figure 7:
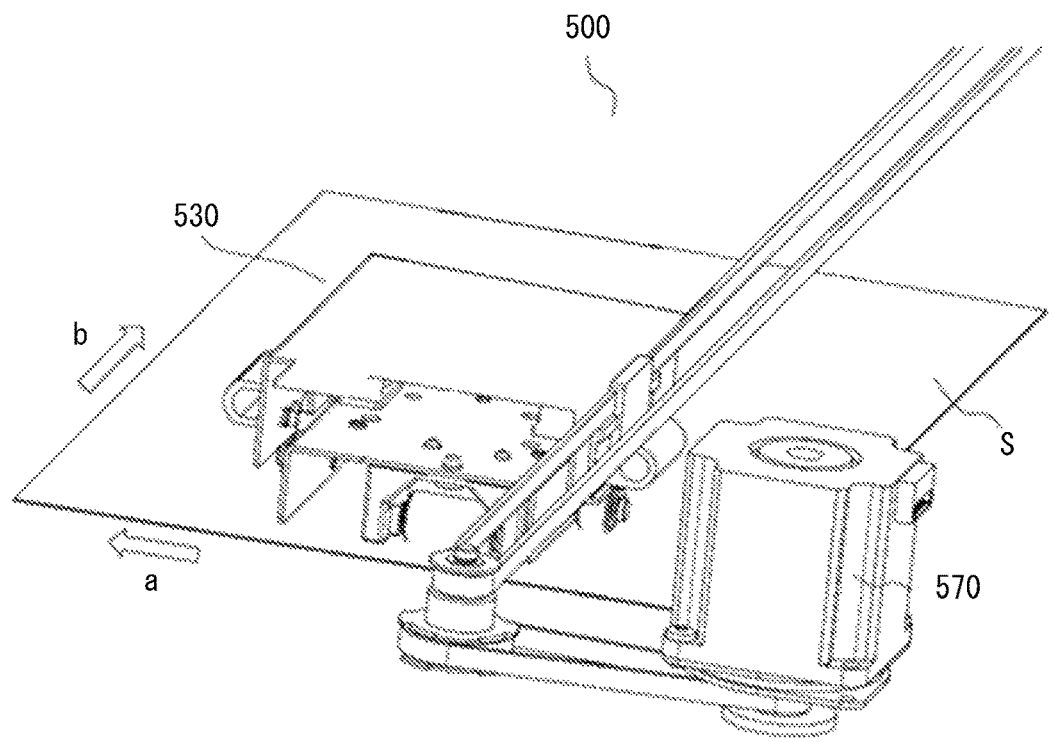
FIG. 7 is an explanatory view of a moving mechanism.
Figure 8:
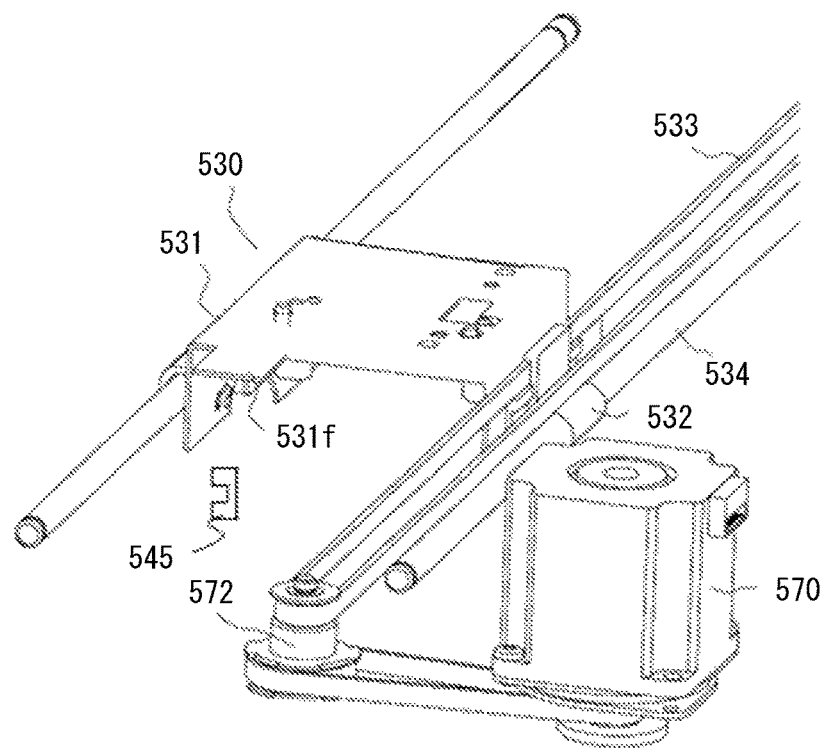
FIG. 8 is an explanatory view of the moving mechanism.
Figure 9:
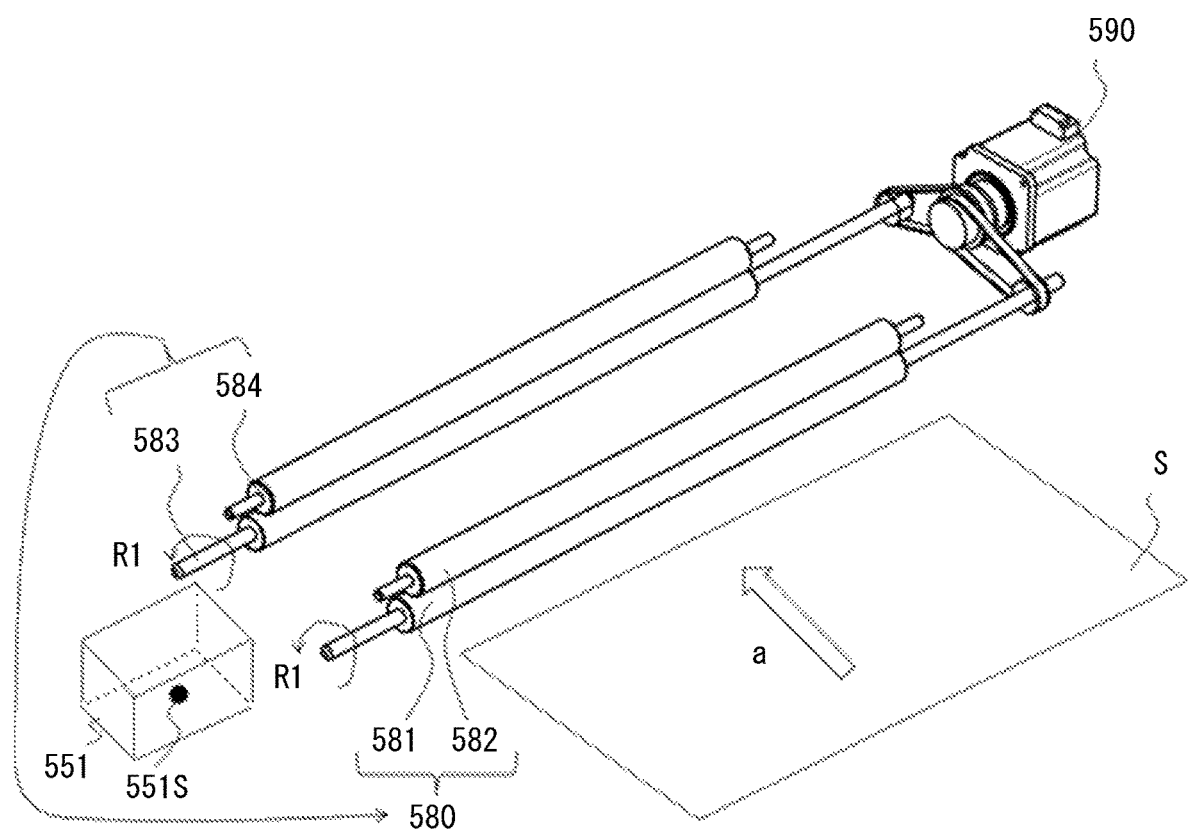
FIG. 9 is an explanatory view of the moving mechanism.

FIG. 7, FIG. 8, and FIG. 9 are explanatory views of the moving mechanism configured to move the color detection sensor 551 in the main scanning direction. The reading unit 500 includes the moving mechanism in addition to the color detection sensor 551. The moving mechanism includes a moving unit 530, a moving drive motor 570, and a position detection sensor 545. The moving unit 530 is used to move the color detection sensor 551 in the main scanning direction. The moving drive motor 570 is configured to drive the moving unit 530. On the moving unit 530, although not shown, the color detection sensor 551 is mounted. As peripheral components of the moving mechanism, a conveyance roller unit 580 and a conveyance drive unit 590 are arranged. The conveyance roller unit 580 is configured to convey the sheet S in an "a" direction. The conveyance drive unit 590 is configured to drive the conveyance roller unit 580. The drive of the moving drive motor 570 and the drive of the conveyance drive unit 590 are controlled by the control unit 451.

When the sheet S is conveyed by the conveyance roller unit 580 to a reading position 551S of the color detection sensor 551, the moving unit 530 starts to move the color detection sensor 551 in the main scanning direction ("b" direction). The timing to convey the sheet S to the reading position of the color detection sensor 551 is determined based on the timing at which the sheet sensor 421 detects the sheet S, the position at which the sheet sensor 421 detects the sheet S, and the conveying speed of the sheet S. The color detection sensor 551 reads the image of the sheet S while moving in the main scanning direction.

The moving unit 530 includes a moving support plate 531 having a moving bearing 532 mounted thereon. The moving bearing 532 is engaged with a moving belt 533 through intermediation of tooth flanks, and is engaged with a moving shaft 534. The moving belt 533 is connected to the moving drive motor 570 through intermediation of a moving pulley 572. With the configuration described above, when the moving drive motor 570 is driven, the moving pulley 572 rotates, and the rotation of the moving pulley 572 causes the moving belt 533 to rotate. The rotation of the moving belt 533 causes the moving unit 530 to move in the "b" direction.

On the moving support plate 531, a flag portion 531f is formed. A moving position of the moving unit 530 is controlled by the number of pulses of a pulse signal to be supplied to the moving drive motor 570, based on the timing at which the position detection sensor 545 detects the flag portion 531f as a basic point.

The conveyance roller unit 580 includes an upstream conveyance drive roller 581 and an upstream conveyance driven roller 582 on the upstream side of the color detection sensor 551 in the conveying direction of the sheet S ("a" direction). Further, the conveyance roller unit 580 includes a downstream conveyance drive roller 583 and a downstream conveyance driven roller 584 on the downstream side of the color detection sensor 551 in the conveying direction of the sheet S. The conveyance roller unit 580 is configured to convey the sheet S which has been conveyed from the conveyance rollers 406 to the conveyance rollers 407 via the reading position 551S (detecting position).

The upstream conveyance drive roller 581 is formed by coating an outer periphery of a pipe made of an aluminum material with urethane having a thickness of 30 μm. The outer diameter of the upstream conveyance drive roller 581 is 20 mm. The upstream conveyance drive roller 581 has its both ends rotatably supported by bearings (not shown). The upstream conveyance driven roller 582 is formed by wrapping silicone rubber on a surface of a roller made of an aluminum material. The outer diameter of the upstream conveyance driven roller 582 is 20 mm. The upstream conveyance driven roller 582 also has its both ends rotatably supported by bearings (not shown). The upstream conveyance drive roller 581 is driven by the conveyance drive unit 590 to be rotated in an R1 direction. The upstream conveyance driven roller 582 is biased toward the upstream conveyance drive roller 581 side by a spring (not shown), to thereby be brought into pressure contact with the upstream conveyance drive roller 581. The upstream conveyance driven roller 582 is rotated in association with the rotation of the upstream conveyance drive roller 581. The upstream conveyance drive roller 581 and the upstream conveyance driven roller 582 form a nip therebetween.

The downstream conveyance drive roller 583 has a configuration similar to that of the upstream conveyance drive roller 581, and is rotated by the conveyance drive unit 590 in the R1 direction. The downstream conveyance driven roller 584 has a configuration similar to that of the upstream conveyance driven roller 582, and is rotated in association with the rotation of the downstream conveyance drive roller 583. The downstream conveyance driven roller 584 is biased toward the downstream conveyance drive roller 583 side by a spring (not shown), to thereby be brought into pressure contact with the downstream conveyance drive roller 583. The downstream conveyance drive roller 583 and the downstream conveyance driven roller 584 form a nip therebetween.

This embodiment employs a configuration in which one conveyance drive unit 590 drives the upstream conveyance drive roller 581 and the downstream conveyance drive roller 583. Otherwise, there may be employed a configuration in which a conveyance drive unit is provided to each of the upstream conveyance drive roller 581 and the downstream conveyance drive roller 583 so that the drive of the upstream conveyance drive roller 581 and the drive of the downstream conveyance drive roller 583 are individually controlled.

<Reading Operation>

Figure 10A:
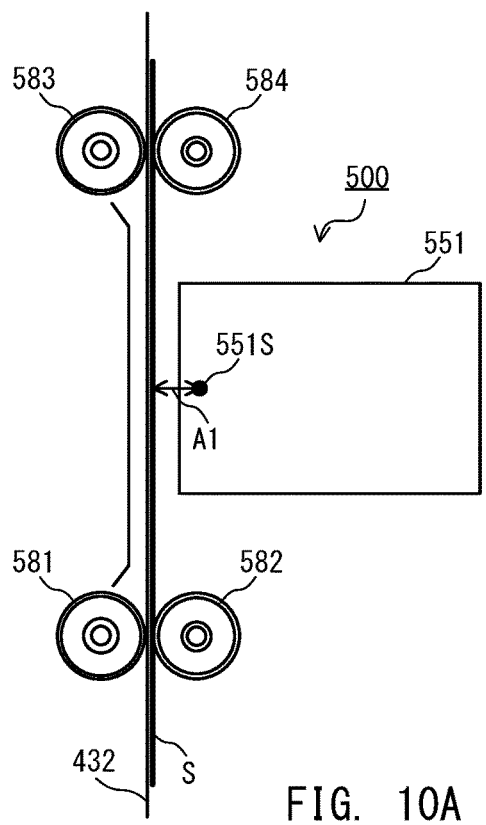
FIG. 10A, FIG. 10B, and FIG. 10C are exemplary views of a posture of a sheet conveyed through a reading path.
Figure 10B:
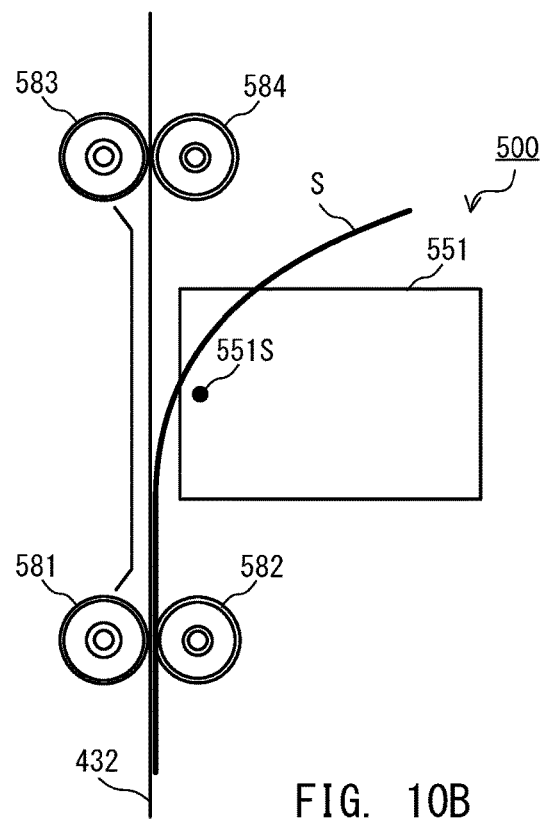
Figure 10C:
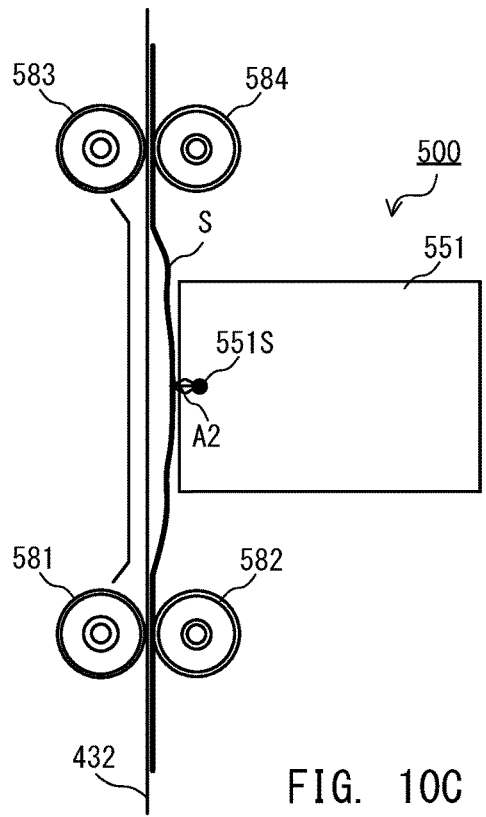

FIG. 10A to FIG. 10C are illustrations of examples of a posture of the sheet S conveyed through the reading path 432, at the reading position 551S of the color detection sensor 551. The reading path 432 is provided so that the sheet S is conveyed from the lower side to the upper side in the vertical direction. The reading unit 500 is configured to read the patch images from the sheet S conveyed in the vertical direction. When the distance between the sheet S and the color detection sensor 551 of the reading unit 500 is not maintained constant, the color detection sensor 551 may be unable to accurately read the patch images from the sheet S.

FIG. 10A is an illustration of an example of a state in which a leading edge of the sheet S in the conveying direction reaches the nip between the downstream conveyance drive roller 583 and the downstream conveyance driven roller 584. The sheet S is nipped between the downstream conveyance drive roller 583 and the downstream conveyance driven roller 584, and is also nipped between the upstream conveyance drive roller 581 and the upstream conveyance driven roller 582. The conveyance drive unit 590 is configured to set a speed of conveying the sheet S by the downstream conveyance drive roller 583 and the downstream conveyance driven roller 584 to be faster by a predetermined amount, for example, by 10% than a speed of conveying the sheet S by the upstream conveyance drive roller 581 and the upstream conveyance driven roller 582. In this manner, the sheet S is brought into a state of being stretched at a predetermined tension. Accordingly, the color detection sensor 551 can read the patch images while moving in the main scanning direction, under a state in which a distance A1 between the sheet S and the color detection sensor 551 is stable.

FIG. 10B is an illustration of an example of a state in which the leading edge of the sheet S deviates from the nip between the downstream conveyance drive roller 583 and the downstream conveyance driven roller 584. In this case, when the color detection sensor 551 is to read the patch images while moving in the main scanning direction, the color detection sensor 551 may be caught by the sheet S to become immovable. FIG. 10C is an illustration of an example of a state in which the leading edge of the sheet S reaches the nip between the downstream conveyance drive roller 583 and the downstream conveyance driven roller 584, but the sheet S is not stretched at a predetermined tension. In this case, a distance A2 between the sheet S and the color detection sensor 551 becomes unstable. When the color detection sensor 551 reads the patch images while moving in the main scanning direction under this state, the measuring accuracy may be reduced.

FIG. 11A to FIG. 11E are explanatory views of processing of reading the patch image by the reading unit 500. Onto the sheet S, a predetermined number of patch images are formed in each of a row direction and a column direction. In this embodiment, patch images P for measurement of "m" rows of from P1 to Pm are formed onto the sheet S. In the column direction of each row, "n" patch images of P1-1, P1-2, P1-3, . . . , and P1-$n$ are formed. That is, one sheet S has m×n patch images arranged thereon.

As described above, the color detection sensor 551 is moved by the moving unit 530 in the main scanning direction orthogonal to the conveying direction of the sheet S. When the patch images are to be read by the color detection sensor 551, the sheet S is controlled to be conveyed or stopped by the conveyance roller unit 580 so that conveyance in a predetermined amount is allowed. The conveyance drive unit 590 repeats an operation of conveying, by the conveyance roller unit 580, the sheet S by a predetermined amount and then temporarily stopping the sheet S. The position of the sheet S is detected by a sheet position detection sensor (not shown). The color detection sensor 551 moves in the main scanning direction while the sheet S is temporarily stopped, and reads the patch images corresponding to one row.

Figure 11A:
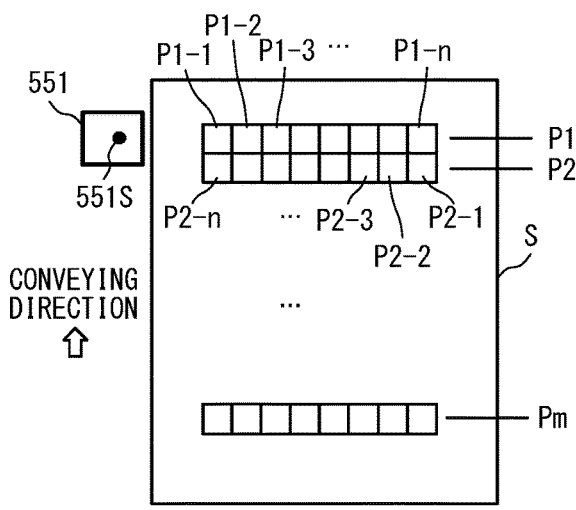
FIG. 11A, FIG. 11B, FIG. 11C, FIG. 11D, and FIG. 11E are explanatory views of processing of reading patch images.
Figure 11B:
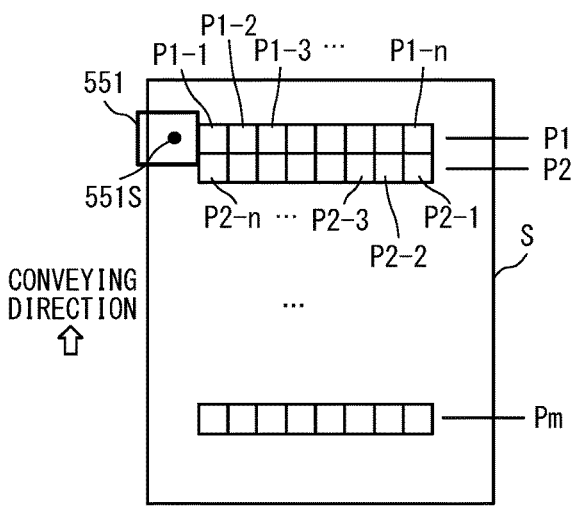

As illustrated in FIG. 11A, when the sheet S is conveyed to the reading position 551S of the color detection sensor 551, the color detection sensor 551 is retreated to and stands by at the outside of the region of the sheet S in the main scanning direction. The sheet S is conveyed until the reading position 551S of the color detection sensor 551 and the positions of the patch images P1 in the first row are matched with each other in the conveying direction, and is then stopped. When the conveyance of the sheet S is stopped, the color detection sensor 551 reads the "n" patch images P1-1 to P1-$n$ in the P1 row while moving in the main scanning direction as illustrated in FIG. 11B.

At this time, as illustrated in FIG. 10A, the leading edge of the sheet S reaches the downstream conveyance drive roller 583 and the downstream conveyance driven roller 584. Accordingly, the sheet S is nipped between the upstream conveyance drive roller 581 and the upstream conveyance driven roller 582, and between the downstream conveyance drive roller 583 and the downstream conveyance driven roller 584. The color detection sensor 551 can read the patch images P1 while moving in the main scanning direction, under a state in which the distance A1 between the color detection sensor 551 and the sheet S is stable. When the sheet S is in the state of FIG. 10B, the color detection sensor 551 cannot move in the main scanning direction due to the sheet S. When the sheet S is in the state of FIG. 10C, the color detection sensor 551 reads the patch images P1 while moving in the main scanning direction under a state in which the distance A2 between the color detection sensor 551 and the sheet S is unstable, and hence the measuring accuracy may be reduced.

Figure 12A:
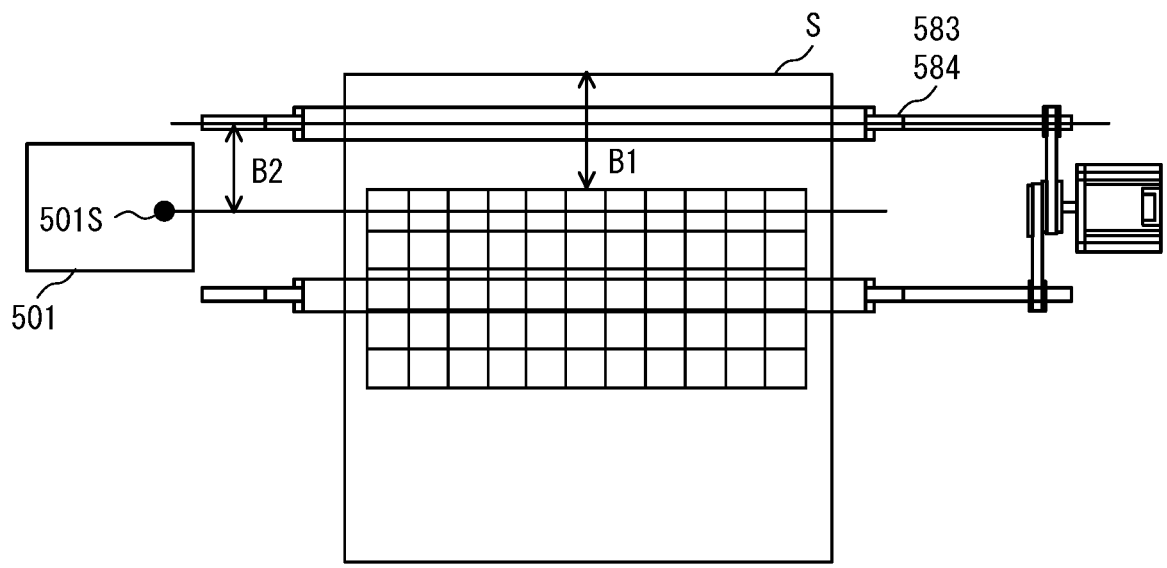
FIG. 12A and FIG. 12B are explanatory views of a formation range of the patch images.
Figure 12B:
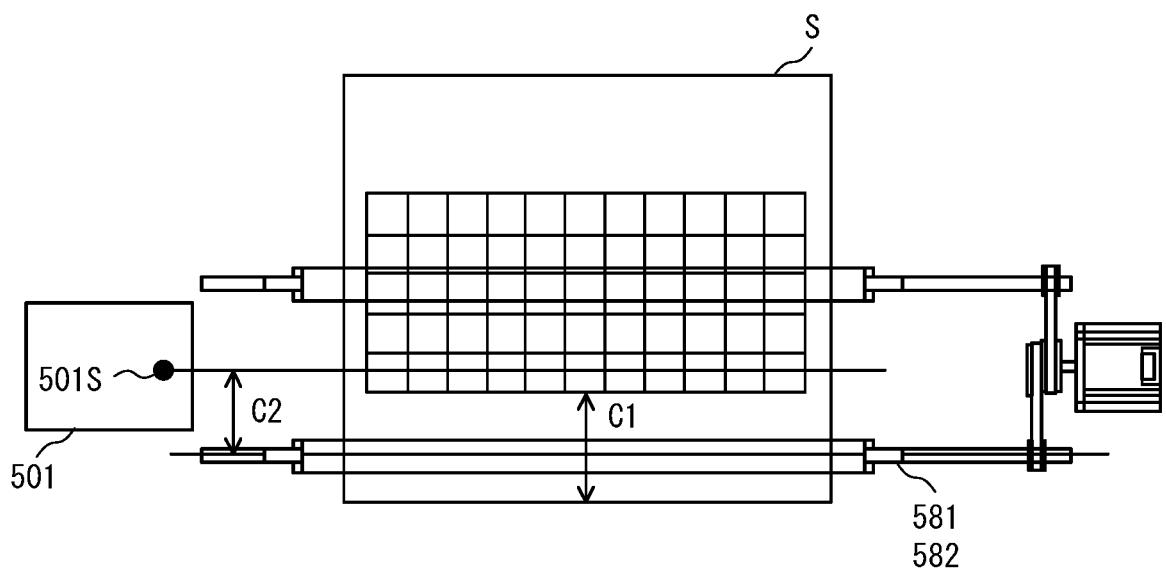

FIG. 12A and FIG. 12B are views for illustrating a formation range of the patch images on the sheet S. The sheet S in this embodiment has a leading end margin B1 on the leading edge side in the conveying direction, and a trailing end margin C1 on the trailing edge side in the conveying direction. The leading end margin B1 and the trailing end margin C1 are regions in which no patch images are formed.

The leading end margin B1 is provided so as to be longer in the conveying direction than a distance B2 in the conveying direction between the reading position 551S of the color detection sensor 551 and the nip (center) formed by the downstream conveyance drive roller 583 and the downstream conveyance driven roller 584. For example, the leading end margin B1 is 60 mm, and the distance B2 is 50 mm. Accordingly, the patch images P1 in the first row are formed at positions separated away from the leading edge of the sheet S in the conveying direction by a distance longer than the distance B2.

The trailing end margin C1 is provided so as to be longer in the conveying direction than a distance C2 in the conveying direction between the reading position 551S of the color detection sensor 551 and the nip (center) formed by the upstream conveyance drive roller 581 and the upstream conveyance driven roller 582. For example, the trailing end margin C1 is 60 mm, and the distance C2 is 50 mm. Accordingly, the patch images Pm in the last row are formed at positions separated away from the trailing edge of the sheet S in the conveying direction by a distance longer than the distance C2.

Accordingly, the formation range of the patch images of the sheet S in this embodiment is within a range obtained by subtracting, from the length of the sheet S in the conveying direction, the distance B2 from the leading edge and the distance C2 from the trailing edge. No margin is required to be provided in the direction (main scanning direction) orthogonal to the conveying direction of the sheet S. The margin in the main scanning direction is mainly determined by the performance of the image forming apparatus 1, and is, for example, 5 mm.

Figure 11C:
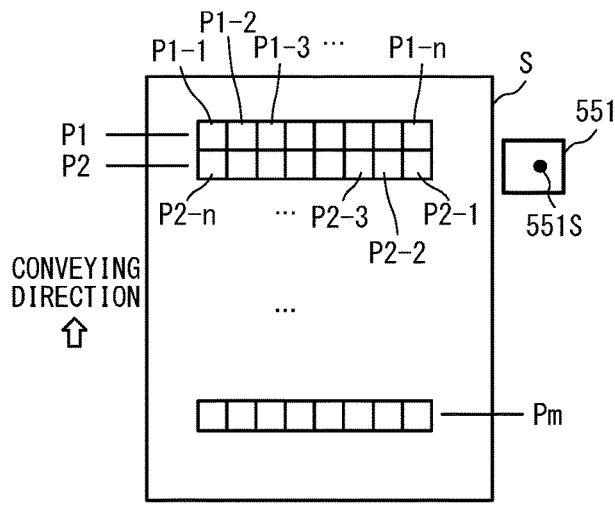
Figure 11D:
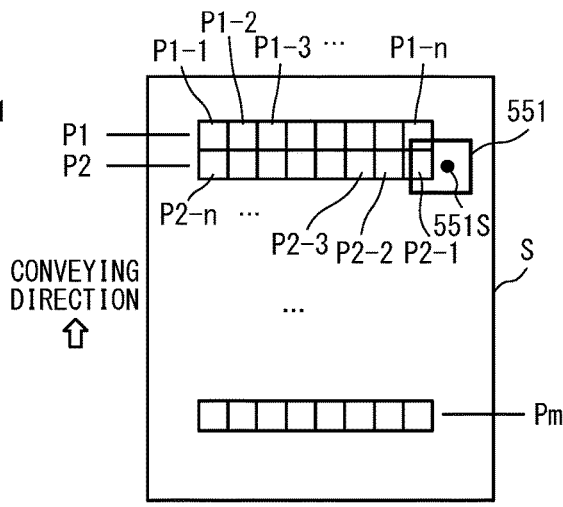

The color detection sensor 551 which has read the patch images P1 in the first row stands by at the outside of the region of the sheet S in the main scanning direction as illustrated in FIG. 11C. Under this state, the sheet S is conveyed until the patch images P2 reach the same position as the reading position 551S in the conveying direction. When the patch images P2 reach the same position as the reading position 551S in the conveying direction, the color detection sensor 551 reads the "n" patch images P2 in the second row while moving in the direction of the patch images P2 as illustrated in FIG. 11D. The color detection sensor 551 reads all of the m×n patch images P formed on the sheet S while moving and reciprocating m/2 times in the main scanning direction. As described above, the color detection sensor 551 reads the patch images P for each row while moving and reciprocating in the main scanning direction.

Figure 11E:
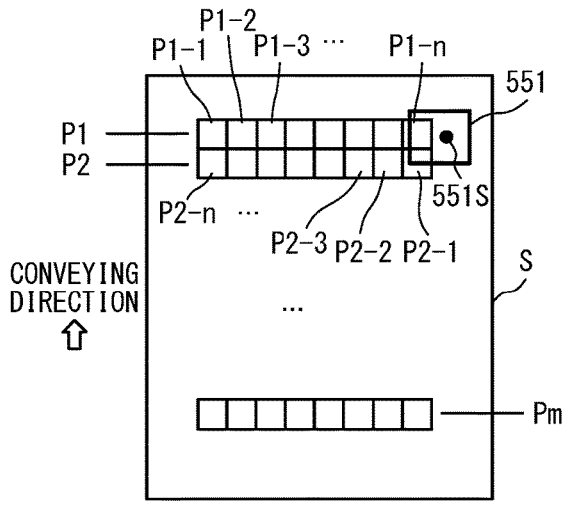

As illustrated in FIG. 11E, the color detection sensor 551 may detect the patch images in the same row two times in a forward path and a return path. In this case, the patch images in the same row are read two times, and hence the reading accuracy is improved.

In this embodiment described above, the patch images of the sheet S are read by the color detection sensor 551 of the reading unit 500 from the sheet S conveyed in the vertical direction. In the reading unit 500, roller pairs configured to nip the sheet S are provided at positions across the reading position 551S, respectively on the upstream side and the downstream side in the conveying direction of the sheet S. When the sheet S is nipped by the two roller pairs (upstream conveyance drive roller 581 and upstream conveyance driven roller 582, and downstream conveyance drive roller 583 and downstream conveyance driven roller 584), the sheet S is brought into a state of being stretched at a predetermined tension. The color detection sensor 551 reads the patch images from the sheet S in this state, while moving in the main scanning direction. Accordingly, the possibility that the color detection sensor 551 becomes immovable due to the sheet S can be reduced, and accurate detection of the patch images is allowed. As described above, in this embodiment, the image of the sheet conveyed in the vertical direction can be read with high accuracy.

In the description above, an example in which the reading unit 500 is provided in the automatic reading apparatus 400 is described, but the automatic reading apparatus 400 may be provided in the printer 100. For example, the reading path 432 on which the reading unit 500 is arranged may be provided after the second fixing device 160 and the conveyance path 130 are joined.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-085710, filed May 15, 2020, which is hereby incorporated by reference herein in its entirety.

What is claimed is:

1. A reading apparatus that reads an image on a sheet conveyed from an image forming apparatus, the reading apparatus comprising:
   a first conveyance path through which a sheet is to be conveyed from the image forming apparatus to a post-processing apparatus to be connected to a subsequent stage of the reading apparatus, the post-processing apparatus being configured to perform post-processing on the sheet;
- a tray, on which a sheet is to be discharged, provided at a position higher than the first conveyance path in a vertical direction;
- a second conveyance path, branched from the first conveyance path at a branched portion, through which a sheet is to be conveyed to the tray;
- a first pair of conveyance rollers provided in the second conveyance path and being configured to nip to convey the sheet, the first pair of conveyance rollers being provided at a position higher than the branched portion in the vertical direction;
- a second pair of conveyance rollers provided between the first pair of conveyance rollers and the tray in the second conveyance path and being configured to nip to convey the sheet conveyed from the first pair of conveyance rollers, the second pair of conveyance rollers being provided at a position higher than both the branched portion and the first pair of conveyance rollers in the vertical direction; and
- a reading unit configured to move in a direction intersecting a conveying direction of the sheet nipped by both of the first pair of conveyance rollers and the second pair of conveyance rollers and to read an image between nip portions of the sheet nipped by the first pair of conveyance rollers and the second pair of conveyance rollers while the reading unit moves in the direction intersecting the conveying direction of the sheet.

2. The reading apparatus according to claim 1, further comprising:
- a guide member that is switchable between a first state of guiding the sheet to the first conveyance path and a second state of guiding the sheet to the second conveyance path.

3. The reading apparatus according to claim 1, further comprising a pair of discharge rollers provided downstream, in the conveying direction of the sheet, of the second pair of conveyance rollers in the second conveyance path and being configured to discharge the sheet to the tray.

4. The reading apparatus according to claim 1,
wherein the second conveyance path includes a curved part and a straight part between the first pair of conveyance rollers and the second pair of conveyance rollers.

5. The reading apparatus according to claim 1,
wherein the second conveyance path includes a curved part and a straight part extending in a gravity direction between the first pair of conveyance rollers and the second pair of conveyance rollers.

6. The reading apparatus according to claim 1, wherein the reading unit is positioned, with respect to the second conveyance path, on a side on which the image forming apparatus is to be connected to the reading apparatus.

7. The reading apparatus according to claim 1, wherein the reading unit is configured to read a part of the image on the sheet while the reading unit moves to a first side in the direction intersecting the conveying direction of the sheet and to read another part of the image on the sheet while the reading unit moves to a second side opposite to the first side in the direction intersecting the conveying direction of the sheet.

8. The reading apparatus according to claim 1,
wherein the first pair of conveyance rollers and the second pair of conveyance rollers are each configured to convey the sheet intermittently, and
wherein the reading unit is configured to read the image on the sheet while the reading unit moves in the direction intersecting the conveying direction of the sheet every time conveyance of the sheet is stopped.

9. The reading apparatus according to claim 1, wherein a speed at which the second pair of conveyance rollers conveys the sheet is faster than a speed at which the first pair of conveyance rollers conveys the sheet.

10. An image forming system comprising:
- an image forming apparatus configured to form an image on a sheet;
- a reading apparatus configured to read an image on a sheet formed by the image forming apparats and conveyed from the image forming apparatus; and
- a post-processing apparatus connected to the reading apparatus and configured to perform post-processing to a sheet passed through the reading apparatus,
wherein the image forming system is configured to control a density of an image to be formed by the image forming apparatus based on a reading result of the reading apparatus,
the reading apparatus including:
- a discharge tray on which a sheet is to be discharged;
- a first conveyance path through which the sheet to be conveyed from the image forming apparatus to the post-processing apparatus passes;
- a second conveyance path, branched from the first conveyance path at a branched portion, through which the sheet to be conveyed from the branched portion to the discharge tray passes;
- a first pair of conveyance rollers provided in the second conveyance path and being configured to nip to convey a sheet;
- a second pair of conveyance rollers provided between the first pair of conveyance rollers and the discharge tray in the second conveyance path and being configured to nip to convey the sheet conveyed from the first pair of conveyance rollers, the discharge tray, the second conveyance path, the first pair of conveyance rollers, and the second pair of conveyance rollers being positioned higher than the branched portion in a vertical direction, and the second pair of conveyance rollers being positioned higher than the first pair of conveyance rollers in the vertical direction; and
- a reading unit configured to move in a direction intersecting a conveying direction of the sheet nipped by both of the first pair of conveyance rollers and the second pair of conveyance rollers and to read an image between nip portions of the sheet nipped by the first pair of conveyance rollers and the second pair of conveyance rollers while the reading unit moves in the direction intersecting the conveying direction of the sheet.

11. The image forming system according to claim 10, wherein the reading apparatus has a guide member that is switchable between a first state of guiding the sheet to the first conveyance path and a second state of guiding the sheet to the second conveyance path.

12. The image forming system according to claim 10, wherein the reading apparatus has a pair of discharge rollers provided downstream, in the conveying direction of the sheet, of the second pair of conveyance rollers in the second conveyance path and being configured to discharge the sheet to the discharge tray.

13. The image forming system according to claim 10, wherein the second conveyance path includes a curved part and a straight part between the first pair of conveyance rollers and the second pair of conveyance rollers.

14. The image forming system according to claim 10, wherein the second conveyance path includes a curved part and a straight part extending in a gravity direction between the first pair of conveyance rollers and the second pair of conveyance rollers.

15. The image forming system according to claim 10, wherein the reading unit is positioned, with respect to the second conveyance path, on a side on which the image forming apparatus is to be connected to the reading apparatus.

16. The image forming system according to claim 10, wherein the reading unit is configured to read a part of the image on the sheet while the reading unit moves to a first side in the direction intersecting the conveying direction of the sheet and to read another part of the image on the sheet while the reading unit moves to a second side opposite to the first side in the direction intersecting the conveying direction of the sheet.

17. The image forming system according to claim 10,
wherein the first pair of conveyance rollers and the second pair of conveyance rollers are each configured to convey the sheet intermittently, and
wherein the reading unit is configured to read the image on the sheet while the reading unit moves in the direction intersecting the conveying direction of the sheet every time conveyance of the sheet is stopped.

18. The image forming system according to claim 10, wherein a speed at which the second pair of conveyance rollers conveys the sheet is faster than a speed at which the first pair of conveyance rollers conveys the sheet.

* * * * *